(12) United States Patent
Mahr (10) Patent No.: US 6,445,529 B1
(45) Date of Patent: Sep. 3, 2002

(54) CORRECTED SERVO CONTROL SIGNAL IN A SERVO CONTROL LOOP

(75) Inventor: Peter Mahr, Weiler (DE)

(73) Assignee: Thomson Licensing, S.A., Boulogne-Billancourt (FR)

( * ) Notice: Subject to any disclaimer, the term of this patent is extended or adjusted under 35 U.S.C. 154(b) by 0 days.

(21) Appl. No.: 09/174,192

(22) Filed: Oct. 16, 1998

(30) Foreign Application Priority Data

Oct. 21, 1997 (EP) .............................. 97402486

(51) Int. Cl.$^7$ ........................... G11B 5/584; G11B 5/596
(52) U.S. Cl. ................................. 360/77.12; 360/77.01
(58) Field of Search .......................... 360/77.12, 77.01, 360/77.02, 77.16

(56) References Cited

U.S. PATENT DOCUMENTS

| 4,613,961 A | 9/1986 | Aarts ........................... 369/44 |
| 5,434,725 A | 7/1995 | Hirose et al. ............ 360/77.04 |
| 5,481,526 A * | 1/1996 | Nagata et al. ....... 369/44.34 X |
| 5,566,145 A * | 10/1996 | Sasaki ................ 369/44.28 X |
| 5,731,924 A * | 3/1998 | Yun ........................ 360/77.08 |

FOREIGN PATENT DOCUMENTS

| EP | 0285800 A2 | 10/1988 | ............ G11B/7/09 |
| EP | 0211912 B1 | 9/1990 | ............ G11B/7/09 |
| EP | 0260637 B1 | 8/1992 | ............ G11B/7/09 |
| GB | 2119189 A | 11/1983 | ............ H03G/3/00 |

* cited by examiner

Primary Examiner—Andrew L. Sniezek
(74) Attorney, Agent, or Firm—Joseph S. Tripoli; Frederick A. Wein (57) ABSTRACT

A device and a method are disclosed for obtaining a corrected servo control signal in a servo control loop take in account a dynamic behavior of the servo control signal to calculate a new threshold for this signal. If the servo control signal for any reason goes beyond the extremum then it is corrected by replacing it with the value of the threshold. Depending on the difference between the servo control signal and the threshold the new threshold may be greater or smaller than the previous threshold value. The threshold may be a maximum or a minimum thus limiting the servo control in its maximum or in its minimum value.

8 Claims, 6 Drawing Sheets

CORRECTED SERVO CONTROL SIGNAL IN A SERVO CONTROL LOOP

FIELD OF THE INVENTION

The present invention relates to a method and to a device for obtaining a corrected servo control signal in a servo control loop.

BACKGROUND OF THE INVENTION

A servo control loop is a closed loop used to keep an object moving along a track centered on that track by giving servo control signals to a positioning device which positions the object laterally to the track. A servo control signal may for different reasons be erroneous and appropriate measures must be taken to detect possible errors and to obtain the corrected servo control signal.

U.S. Pat No. 5,434,725, Hirose et al., discloses a device for positioning a magnetic head relative to a disc-shaped data carrier. The magnetic head reads servo data which is subsequently processed to obtain a servo control signal and a number. A comparator compares the number to a predetermined value and sets an error flag should the number be less than the predetermined value. The latter case is an indication for defective servo data. Normally, the servo control signal is used as an input for positioning the magnetic head but if the error flag is set the servo control signal is erroneous. The use of the erroneous servo control signal would possibly lead to a positioning of the magnetic head far off track, an error which is difficult to recover from. Instead a previous servo control signal, obtained from previously read and processed servo data is used to position the magnetic head. This compensates for the defective servo data and minimizes positioning errors.

The disclosed device handles errors due to defective servo data thereby taking into account an evolution of the servo control signal prior to the occurrence of defective servo data. It takes into account a dynamic behavior of the servo control signal by using the previous servo control signal instead of the erroneous one.

However errors due to defective servo data belong to only one type of error out of many possible types. Other occurring errors may be due to sudden peaks in the servo control signal. These peaks may be caused by an excessive deviation of a device reading the servo data away from e.g. a servo track containing the servo data. Excessive deviations typically happen when a sudden external mechanical force affects the device reading the servo data or perhaps a carrier carrying the servo data.

An aim of the present invention is to correct errors in the servo control signal which may be caused not only by defective servo data. The errors should be corrected taking into account the servo control signal's dynamic.

SUMMARY OF THE INVENTION

In a first aspect of the invention a method for obtaining a corrected servo control signal in a servo control loop comprises reading servo data, processing read servo data to obtain at least a servo control signal, substituting a determined corrected servo control signal to the servo control signal if a value of processed read servo data overruns a determined threshold, the determined corrected servo control signal having a value proportional to the determined threshold. The method further comprises calculating a new threshold and substituting the new threshold to the determined threshold.

In a second aspect of the invention a flag is set if a value of processed read servo data overruns the determined threshold; The determined corrected servo signal is substituted to the servo control signal if the flag is set The new threshold is calculated as a function of the flag and a value of the servo control signal.

In a third aspect of the invention the calculating comprises calculating the new threshold from the determined threshold by increasing or decreasing the determined threshold depending on whether it is a maximum or a minimum respectively, if the flag is set. In the opposite case of the latter the calculating is done by increasing or decreasing the determined threshold if it is a maximum and if an absolute value of a difference between the determined threshold and the value of the servo control signal is smaller or greater than a determined Δ-value respectively, and by increasing or decreasing the determined threshold if it is a minimum and if an absolute value of a difference between the determined threshold and the value of the servo control signal is greater or smaller than the determined Δ-value respectively.

In a fourth aspect of the invention a minimum and a maximum respectively are used for the determined threshold.

In a fifth aspect of the invention a device for obtaining a corrected servo control signal in a servo loop comprises reading means to read servo data from a data carrier, processing means to obtain at least a servo control signal from read servo data, comparing means to compare a value of processed read servo data to a determined threshold, output means which generate a determined corrected servo control signal if a value of processed read servo data overruns the determined threshold, the determined corrected servo control signal being proportional to the determined threshold, updating means to calculate a new threshold and to substitute the new threshold to the determined threshold.

In a sixth aspect of the invention a servo loop positioning device for positioning an object relative to a predetermined track comprises a tracking head, to which the object is rigidly maintained, with reading means for reading servo data recorded along at least one servo track on a data carrier which is fixed in space relatively to the predetermined track, the servo track being parallel to the predetermined track, lateral positioning means for positioning the tracking head in a direction lateral to the servo track, signal processing means for processing read servo data, thereby determining a lateral position of the tracking head relative to the servo track and producing a servo control signal for the lateral positioning means such that the tracking head is positioned to be laterally centered on the servo track, comparing means to compare a value of processed read servo data to a determined threshold, output means which generate a determined corrected servo control signal if a value of processed read servo data overruns the determined threshold, and which feed the corrected determined servo control signal to the lateral positioning means by substituting it to the servo control signal, the determined corrected servo control signal being proportional to the determined threshold, and updating means to calculate a new threshold and to substitute the new threshold to the determined threshold.

DESCRIPTION OF THE PREFERRED EMBODIMENTS

Figure 1:
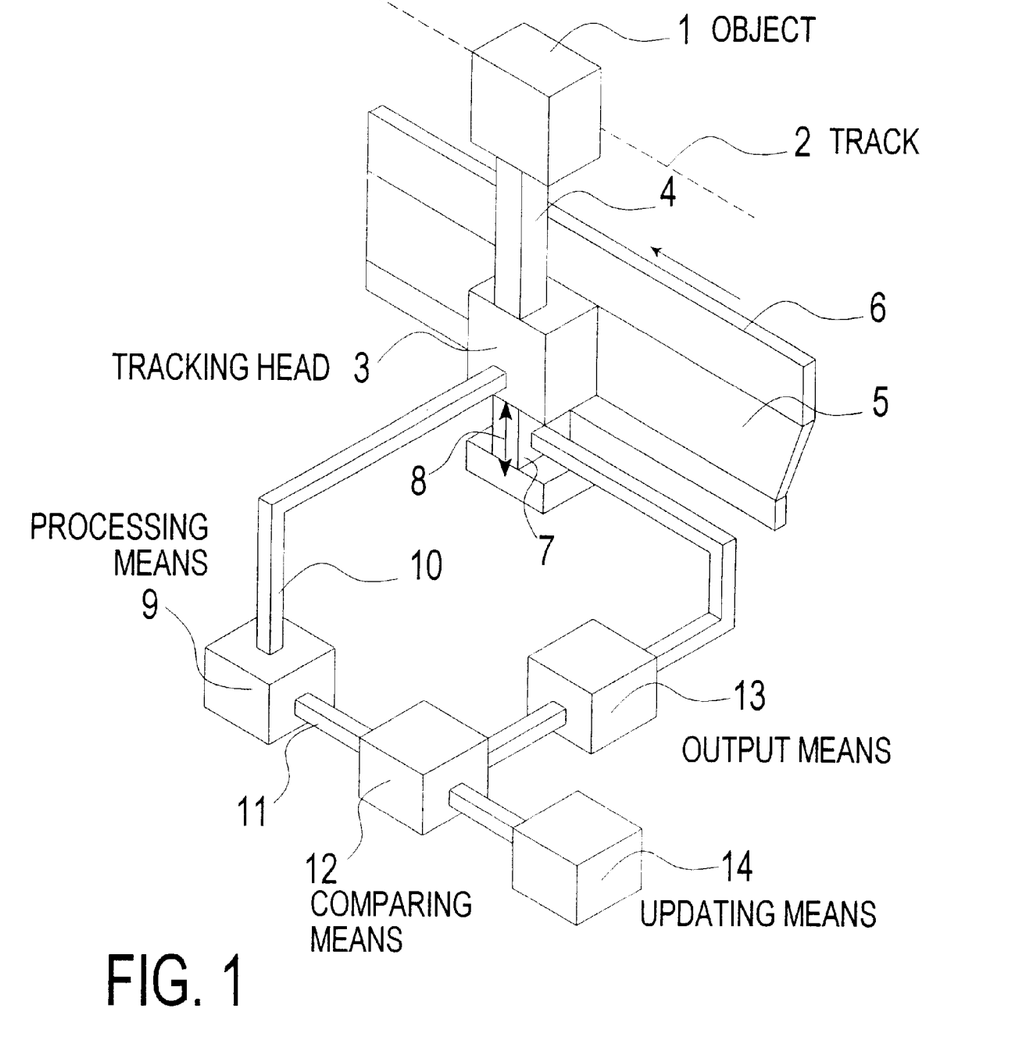
FIG. 1 contains a diagram of a servo loop positioning device according to the invention.

The servo loop positioning device show in FIG. 1 is used to position an object 1 relative to a predetermined track 2 (represented as a dotted line). The object 1 may for example be a magnetic reading/writing head which reads/writes data in a data track which is parallel to the predetermined track 2. The object 1 is rigidly connected to on a tracking head 3 using a rigid rod 4. The tracking head 3 comprises reading means (not shown) (e.g. magnetic gaps, longitudinal driving means) which allow to read servo data (not shown) recorded along a servo track 5. The servo track 5 is carried by a data carrier 6 and at all times parallel to the predetermined track 2. This means that the data carrier 6 is fixed in space relatively to the predetermined track 2. For this reason it would be useful to have for the example of the magnetic head given above the data track on the data carrier 6 parallel to the servo track 5. Lateral positioning means 7 allow to position the tracking head 3 in a direction represented by a double arrow 8, i.e. laterally to the servo track 5. The lateral positioning means 7 may for example be a piezo Crystal device. The read servo data is transmitted to signal processing means 9 through a cable 10. The signal processing means 9 process the read data to obtain at an output 11 a servo control signal. The servo control signal may later be used to feed the lateral positioning means 7. The servo control signal is obtained after the servo data processor 9 has determined a lateral position of the tracking head 3 relative to the servo track 5. The servo control signal has a value such that when fed to the lateral positioning means 7 the tracking head 3 is positioned to be laterally centered on the servo track 5. The output 11 is connected to comparing means 12 in which a flag is set. Depending on the flag, output means 13 connected to an output of comparing means 12 generate a determined corrected servo control signal. The servo control signal or the determined corrected servo control signal are transmitted and feed to the lateral positioning means 7. The flag is set by the comparing means as a result of a comparison of a value of the servo control signal to a determined threshold. More precisely the flag is set if the value of the servo control signal overruns the determined threshold. Even more precisely, if the determined threshold is a maximum, the flag is set when the value of the servo control signal is greater than this maximum. If the value of the servo control signal is smaller than this maximum, i.e. the threshold is not overrun, the flag is left unset.

An updating means 14 connected to the comparing means updates the determined threshold by calculating as a function of the flag and of the value of the servo control signal a new threshold and substituting this to the determined threshold.

Figure 2:
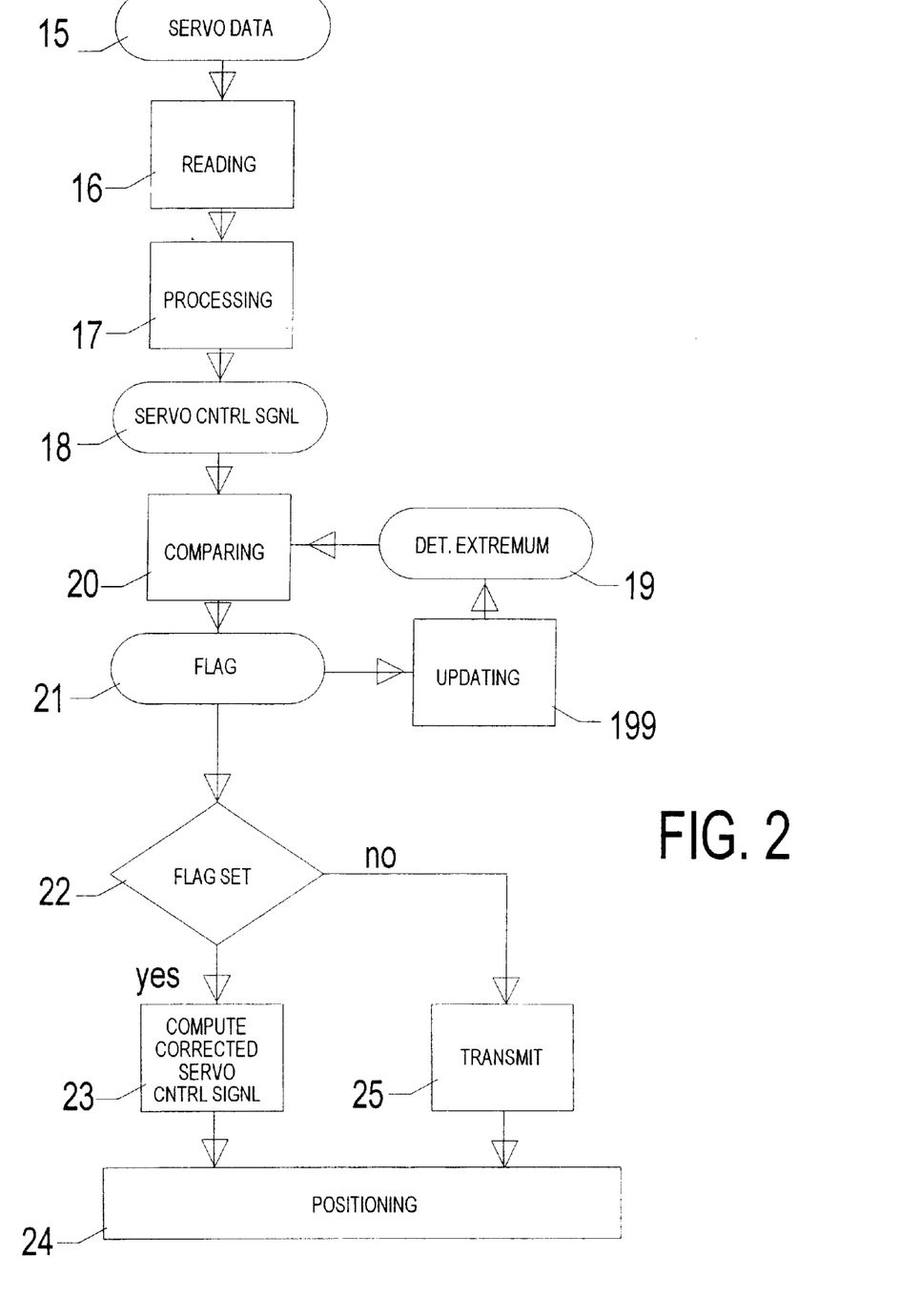
FIG. 2 contains a flowchart illustrating a method for obtaining a corrected servo control signal.

A flowchart in FIG. 2 illustrates how either a corrected servo control signal or a servo control signal is obtained and transmitted to be used in a positioning step 24. Servo data 15 is read in a reading step 16 and subsequently processed in a processing step 17 to obtain a servo control signal 18. A determined threshold 19 and the servo control signal 18 are compared in a comparing step 20 and the flag 21 is set as lined out above. Depending on a condition "flag set" in case consideration 22, if the condition is "yes" a determined corrected servo control signal is computed in a step 23 and transmitted to the positioning step 24. If the condition is "no" the servo control signal 18 is transmitted in a step 25 to the positioning step 24. An updating step 199 updates the determined extremum 19.

Figure 3:
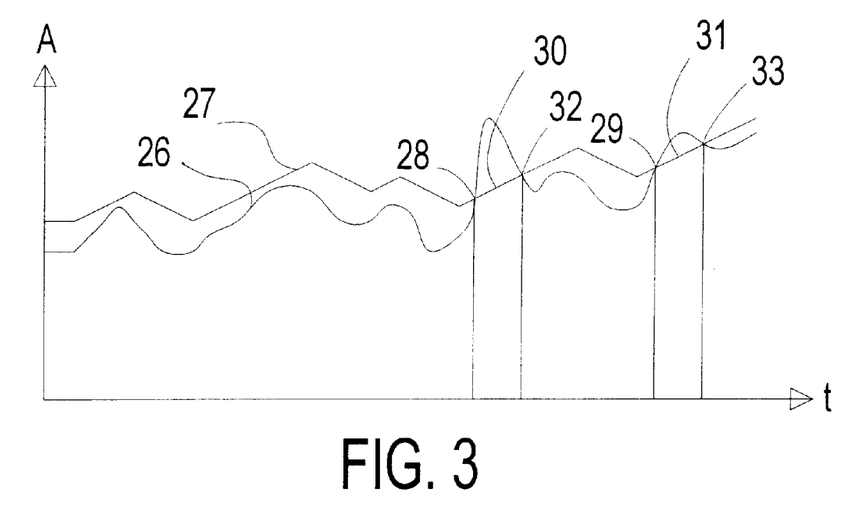
FIG. 3 contains curves illustrating a servo control signal and a corrected servo control signal.

Referring to FIG. 3 an example curve 26 of a servo control signal and an example curve 27 of a determined threshold are shown. Both curves 26 and 27 have amplitudes represented on an axis A, which vary as a function of time t. The determined threshold is in this case a maximum. This means that if the servo control signal becomes greater than the determined threshold as in intersections 28 and 29, determined corrected servo control signals 30 and 31 are computed and substituted to the servo control signal until the latter becomes smaller than the determined threshold, i.e. in intersections 32 and 33. The corrected servo control signals 30 and 31 are equal to the determined threshold and their value lies on the curve 27.

Figure 4:
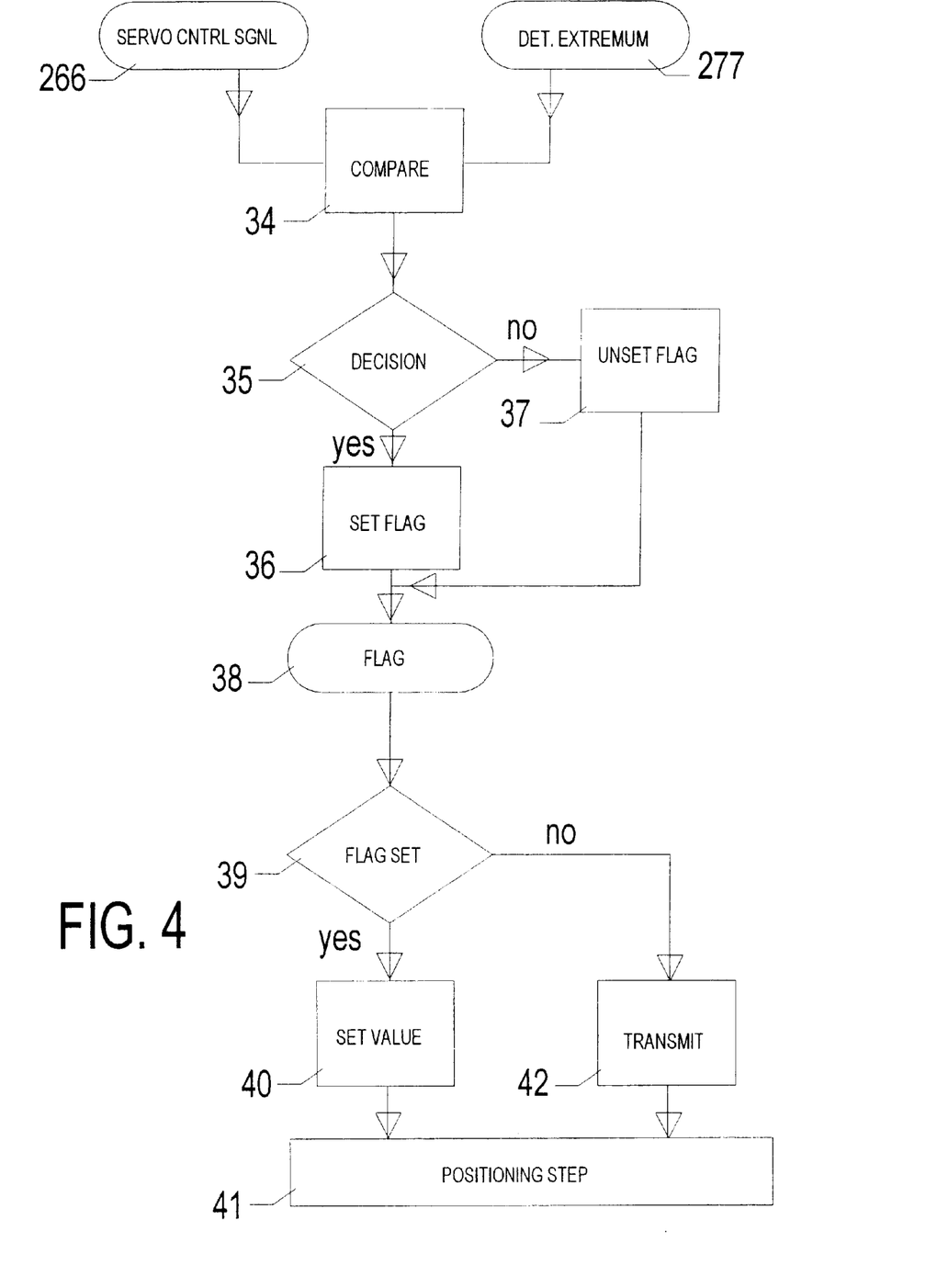
FIG. 4 contains a flowchart illustrating a preferred embodiment of a method for obtaining a corrected servo control signal.

A flowchart in FIG. 4 illustrates how the corrected servo control signal 30 and 31 are obtained and substituted to the servo control signal. The servo control signal 266 from curve 26 and the determined threshold 277 from curve 27 are compared in a step 34 to see if the servo control signal 266 is greater than the determined threshold 277. If this is the case, a decision step 35 leads to setting a flag in a step 36. In an opposite case, the decision step 35 leads to a step 37 where the flag is made sure to be unset. Either case leads to the obtention of a flag 38 which is checked in a decision step 39. In case the flag is set, the corrected servo signal 30 (or 31) is made equal to the value of the determined threshold (curve 27) in step 40 before being fed to a positioning step 41. In case the flag is unset step 42 feeds the servo control signal 266 to the positioning step 41.

Figure 5:
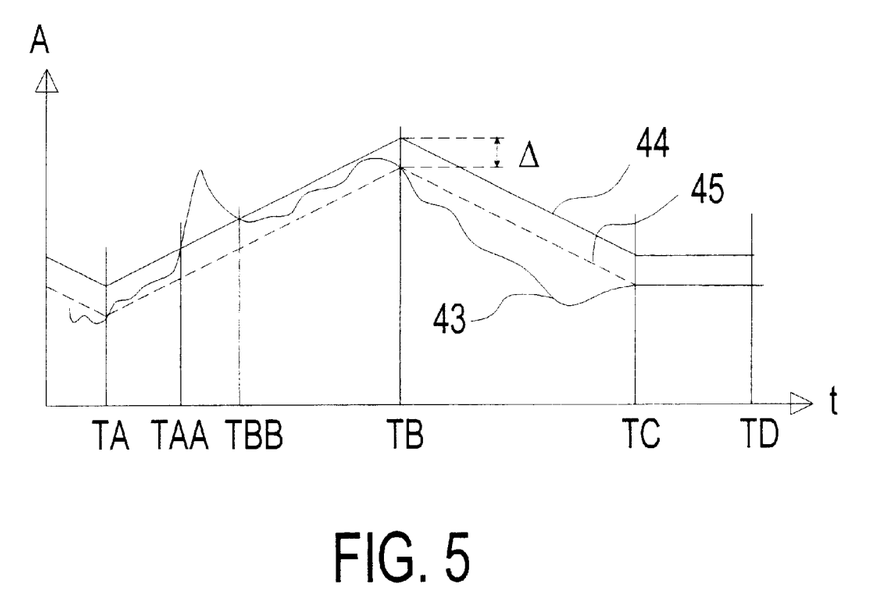
FIG. 5 contains curves of a servo control signal and of threshold values.

FIG. 5 shows a curve 43 of a servo control signal and a curve 44 of a determined threshold, both of which varying as a function of time t. The curves 43 and 44 will help to illustrate a function which is used to calculate a new threshold departing from the determined threshold. A dotted curve 45 is parallel to the curve 44 at a distance $\Delta$.

Figure 6:
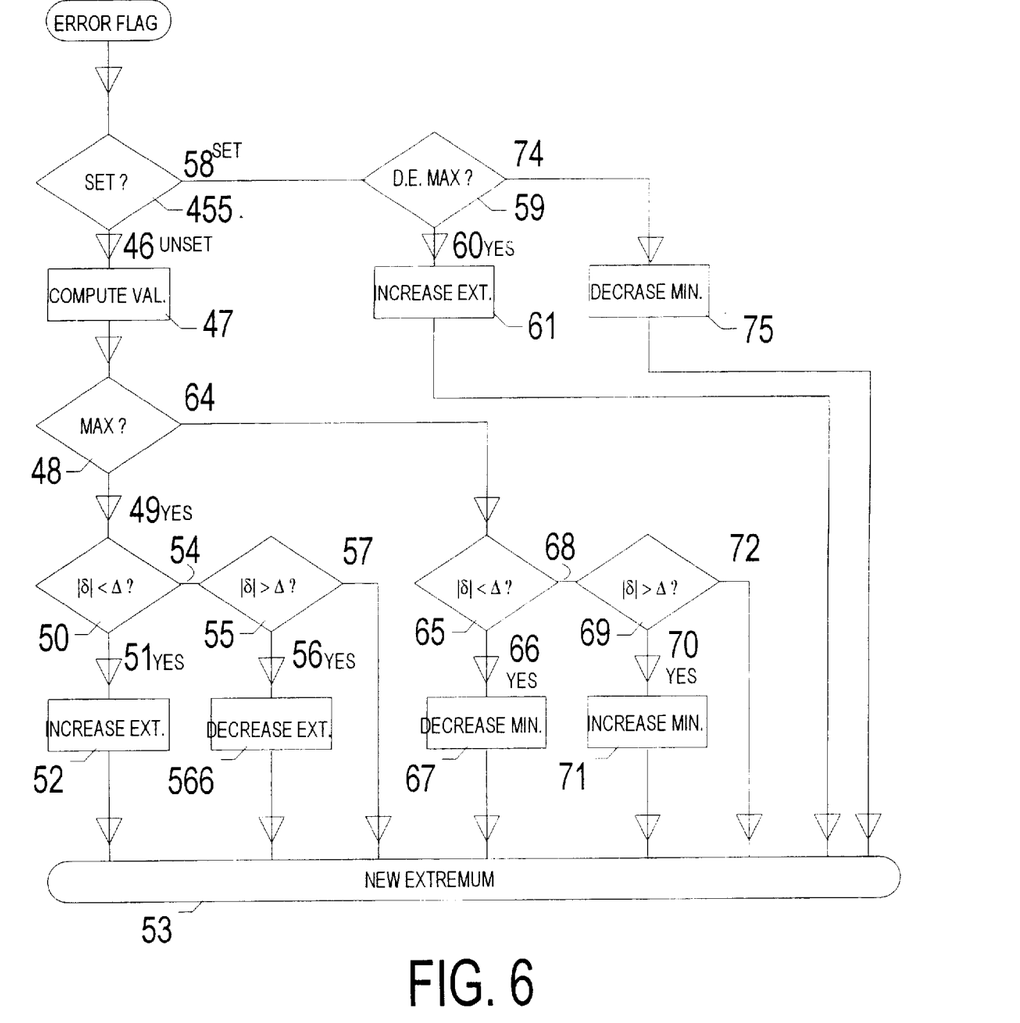
FIG. 6 contains a flowchart illustrating a calculating of a new threshold.

Referring now to a flowchart in FIG. 6 where it is illustrates how the determined threshold is updated, a first case consideration 455 checks if an error flag is set. As explained above the error flag is set when the servo control signal overruns the determined threshold. If the flag is unset (case 46) an absolute value $|\delta|$ of a difference between the determined DE and the servo control signal SCS is computed in step 47:

$$|\delta|=|DE-SCS|$$

A second case consideration 48 checks if the determined threshold is a maximum. In the affirmative case 49 which is the one illustrated in FIG. 5 a third case consideration 50 checks if $|\delta|$ is smaller than the distance $\Delta$. Referring to FIG. 5 this would means that the curve 43 of the servo control signal is comprised between the dotted curve 45 and the curve 44 of the determined threshold.

If such is the case (case 51) the determined threshold is increased in step 52 to obtain the new threshold 53. This is what occurs between instants TA and TAA or TBB and TB for example. In the example of FIG. 5 a function FI(DE) used to calculate the new threshold NE is of the form:

$$NE=FI(DE)=DE+a$$

in which a is positive when the determined threshold is to be increased. If in the third case consideration 50 |δ| is not smaller than Δ (case 54) a fourth case consideration 55 checks if |δ| is greater than Δ. If true (case 56) the determined threshold is decreased in a step 566 according to a function FI(DE) to obtain the new threshold:

$$NE=FD(DE)=DE-a \quad (a>0)$$

This is what occurs between instants TB and TC for example. If the fourth case consideration 55 reveals false (case 57), then |δ| is equal to the distance Δ and the new threshold NE is set equal to the determined threshold DE:

$$NE=DE$$

This is what occurs between instants TC and TD for example.

If the first case consideration 455 reveals that an error flag is set (case 58) a fifth case consideration 59 checks if the determined threshold is a maximum. In an affirmative case 60 the determined threshold increased in step 61 by calculating the new threshold NE with the function NE FI(DE). This is what occurs between instants TAA and TBB for example, where the servo control signal overruns the determined threshold.

Figure 7:
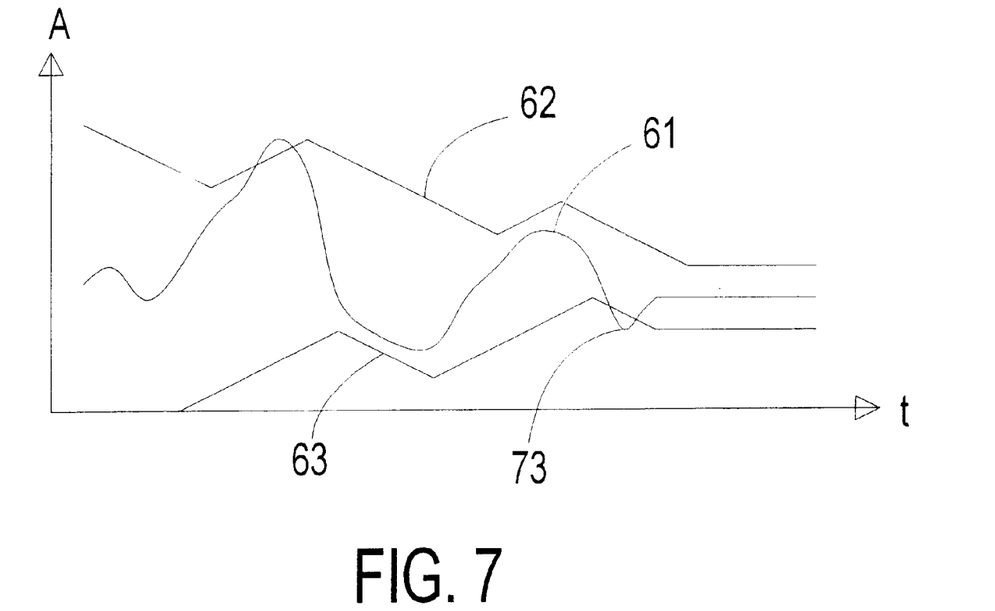
FIG. 7 contains curves of a servo control signal, minimum and maximum (threshold) values.

Another example for a servo control signal is given by a curve 61 in FIG. 7. A curve 62 representing a determined maximum evolves is a way similar to the one described for FIG. 5 and according to the flowchart in FIG. 6. A further curve 63 represents a determined minimum which varies as a function of the time t. The flowchart in FIG. 6 illustrates how a new minimum may be calculated departing from the determined minimum.

If the first case consideration 455 reveals that the error flag is unset (case 46) then |δ| is computed in 47 as |δ|=|DM−SCS|, DM being the value of the determined minimum.

In the seconds case consideration 48 the result is negative since the determined threshold is a minimum and branch 64 leads to a sixth case consideration 65 which checks if |δ| is smaller than Δ. In the affirmative case 66 the determined minimum is decreased in 67 according to the function FD(DM) to obtain a new threshold (minimum) NM:

$$NM=FD(DM)=DM-a \quad (a>0)$$

If the sixth case consideration 65 reveals false (case 68) a seventh case consideration 69 checks if |δ| is greater than Δ. In the affirmative (case 70) the determined minimum is increased in 71 according to the function FI (DM) to obtain the new threshold (minimum) NM:

$$NM=FI(DM)=DM+a \quad (a<0)$$

If the seventh case consideration 69 reveals false (case 72) then δ is equal to the distance Δ and the new threshold (minimum) NM is set equal to the determined minimum DM:

$$NM=DM$$

Coming back to the first case consideration 455, if it is true (case 58) i.e. the servo control signal overruns the determined minimum, e.g. peak 73 in FIG. 7, then the fifth case consideration 59 results in false (case 74) because the determined threshold is a minimum and the determined minimum is decreased in a step 75 with the function NM=FD (DM).

The example shown in FIG. 7 readily demonstrates how the servo control signal's dynamic is taken into account. The curves 62 and 63 of determined threshold are adapted to the dynamic behavior of the servo control signal curve 61, i.e. at the left side of the diagram where relatively important variations of the servo control signal occur the curves 62 and 63 are wide apart. The curves 62 and 63 evolve to a nearer position to each other at the right hand side of FIG. 7 where variations of the servo control signal become relatively insignificant of the determined threshold (minimum and/or maximum). The corrected servo signal is used instead of the servo control signal if the servo control signal exhibits a dynamic behavior which overruns the limit defined by the permanently actualized threshold, e.g. the peak 73. The servo control signal is confined between the determined minimum and maximum. This prevents errors due to sudden peaks in the servo control signal.

The updating as illustrated in the flowchart of FIG. 6 may be implemented in a device, e.g. the device shown in FIG. 1. For this purpose the updating means 14 comprise first adding means (not shown) which perform the increasing and decreasing of the determined threshold as in steps 52, 566, 67 and 71 of the flowchart. The updating means further comprise second adding means (not shown) which allow to calculate |δ| as described for step 47 and at least further comparing means (not shown) to perform e.g. the case consideration 48.

What is claimed is:

1. A method for obtaining a corrected servo control signal in a servo control loop, comprising the steps of:

obtaining servo data;

processing said servo data to obtain at least a servo control signal;

substituting a determined corrected servo control signal for the servo control signal if a value of said processed servo data overruns a determined threshold, the determined corrected servo control signal having a value proportional to the determined threshold;

calculating a new threshold;

substituting the new threshold for the determined threshold;

calculating the new threshold as a function of a value of the servo control signal if a value of processed read servo data overruns the determined threshold; and wherein the calculating comprises a calculating of the new threshold from the determine threshold:

by increasing or decreasing the determined threshold depending on whether it is a maximum or a minimum respectively, if a value of processed read servo data overruns the determined threshold, and in an opposite case:

by increasing or decreasing the determined threshold if it is a maximum and if an absolute value of a difference between the determined threshold and the value of the servo control signal is smaller or greater than a determined Δ value respectively, and by increasing or decreasing the determined threshold if it is a minimum and if an absolute value of a difference between the determined threshold and the value of the servo control signal is greater or smaller than the determined Δ value respectively.

2. A method for obtaining a corrected servo control signal according to claim 1, wherein the calculating comprises setting the new threshold equal to the determined threshold in the opposite case if an absolute value of a difference between the determined threshold and the value of the servo control signal is equal to the determined Δ value.

3. A method for obtaining a corrected servo control signal according to claim 2, wherein a minimum and a maximum are respectively used for the determined threshold.

4. A method for obtaining a corrected servo control signal according to claim 1, wherein a minimum and a maximum are respectively used for the determined threshold.

5. A device for obtaining a corrected servo control signal in a servo loop comprising:

reading means to obtain servo data from a data carrier, processing means to obtain at least a servo control signal from said servo data, comparing means to compare a value of processed servo data to a determined threshold, output means which generate a determined corrected servo control signal if a value of processed servo data overruns the determined threshold, the determined corrected servo control signal being proportional to the determined threshold, updating means to calculate a new threshold and to substitute the new threshold for the determined threshold;

said comparing means being provided for checking if a value of processed read servo data overruns the determined threshold, said output means generating the determined corrected servo signal if the value of processed read servo data overruns the determined threshold, and said updating means calculates the new threshold as a function of a value of the servo control signal if said value of processed read servo data overruns the determined threshold and wherein the updating means comprises:

first adding means for increasing and/or decreasing the determined threshold by adding or subtracting a predetermined value to the threshold, second adding means for determining an absolute value of a difference between the determined threshold and the value of the servo control signal, and further comparing means to compare the absolute value to a determined $\Delta$ value, the comparing means and the further comparing means being connected to the first adding means.

6. A device for obtaining a servo control signal according to claim 5, wherein a minimum and a maximum are respectively used for the determined threshold.

7. A servo loop positioning device for positioning an object relative to a predetermined track comprising:

a tracking head, to which the object is rigidly maintained, with reading means for reading servo data recorded along at least one servo track on a data carrier which is fixed in space relatively to the predetermined track, the servo track being parallel to the predetermined track, lateral positioning means for positioning the tracking head in a direction lateral to the servo track, signal processing means for processing read servo data, thereby determining a lateral position of the tracking head relative to the servo track and producing a servo control signal for the lateral positioning means such that the tracking head is positioned to be laterally centered on the servo track, comparing means to compare a value of processed read servo data to a determined threshold, output means which generate a determined corrected servo control signal if a value of processed read servo data overruns the determined threshold, and which feed the corrected determined servo control signal to the lateral positioning means by substituting it to the servo control signal, the determined corrected servo control signal being proportional to the determined threshold, updating means to calculate a new threshold and to substitute the new threshold to the determined threshold, and wherein:

the comparing means detects if a value of processed read servo data overruns the determined threshold, the output means generates the determined corrected servo control signal if the value of processed read servo data overruns the determined threshold, and the updating means calculates the new threshold as a function of a value of the servo control signal if said value of processed read servo data overruns the determined threshold; wherein the updating means comprise:

first adding means for increasing and/or decreasing the determined threshold, by adding or subtracting a predetermined value to the threshold, second adding means for determining an absolute value of a difference between the determined threshold and the value of the servo control signal, further comparing means to compare the absolute value to a determined $\Delta$ value, the comparing means and the further comparing means being connected to the first adding means.

8. A server loop positioning device according to claim 7, wherein a minimum and a maximum are respectively used for the determined threshold.

* * * * *